Nov. 24, 1964 W. A. JONES 3,158,044

PRECISION MACHINING APPARATUS

Filed April 24, 1961 2 Sheets-Sheet 1

INVENTOR.

William A. Jones

BY Kenway, Jenney & Hildreth

ATTORNEYS

PRECISION MACHINING APPARATUS

Filed April 24, 1961 2 Sheets-Sheet 2

INVENTOR.

William A. Jones

BY Kenway, Jenney & Hildreth

ATTORNEYS 3,158,044
Patented Nov. 24, 1964

3,158,044

PRECISION MACHINING APPARATUS

William A. Jones, Hingham, Mass., assignor to Northrop Corporation, Beverly Hills, Calif., a corporation of California Filed Apr. 24, 1961, Ser. No. 104,997
2 Claims. (Cl. 77—33.5)

This invention relates to precision machining apparatus, and more particularly to machining apparatus of the kind in which a feed slide carrying a rotating cutting tool is fed along a machining axis by motive means laterally offset from the machining axis.

It is the primary object of my invention to provide an improved rotary machining apparatus having means for minimizing the tendency of motive means laterally offset from a machining axis to cause canting of a feed slide carrying a cutting tool, so as to afford improved machining accuracy. It is a further object of my invention to provide an improved precision rotary machining apparatus having stop abutment means for halting the movement of a feed slide at a predetermined point, which eliminate the tendency of laterally-offset motive means to cant the feed slide from its axis. Further objects and advantages of the invention will become apparent as the following description proceeds.

Briefly stated, according to a preferred embodiment thereof, I may carry out my invention in part by mounting a feed slide for movement along a machining axis by means of pre-loaded bearing means spaced apart along the machining axis. A quill shaft for supporting a cutting tool is rotatably mounted in the feed slide for movement therewith along the machining axis by means of further bearings, and motive means are provided for rotating the quill shaft to operate the tool. Motive means for actuating the feed slide and the quill shaft along the machining axis to feed the cutting tool into the work are arranged for movement along an axis laterally offset from the machining axis. The motive means may, for example, comprise a pneumatic and/or hydraulic actuator having a piston-operated actuating arm movable along an offset axis parallel to the machining axis. Actuation of the feed slide by these means tends to cant the slide with respect to the machining axis, causing out-of-round or oversized surfaces to be formed by the cutting tool. According to a feature of the invention, I drivingly interconnect the motive means with the feed slide by means of an arm secured to the feed slide at a point intermediate the axially-spaced bearing means thereof. This arrangement equally distributes the canting moment upon the pre-loaded bearings, and minimizes the tendency of the feed slide to cant.

To limit the axial length of a cut formed by the apparatus to a predetermined dimension, stop abutment means are provided for halting the movement of the feed slide at a selected position along the machining axis. According to a further feature of the invention, these stop means are aligned with the motive means on the laterally offset axis, so that the reaction force restraining further movement of the slide is applied directly upon the offset axis to the motive means, rather than to the feed slide itself. I thus eliminate any tendency of the motive means to apply a canting moment to the feed slide as these elements are stopped.

While the specification concludes with claims distinctly pointing out the subject matter which I regard as my invention, it is believed that the invention will be more clearly understood from the following detailed description of a preferred embodiment thereof, referring to the accompanying drawings, in which:

Figure 4:
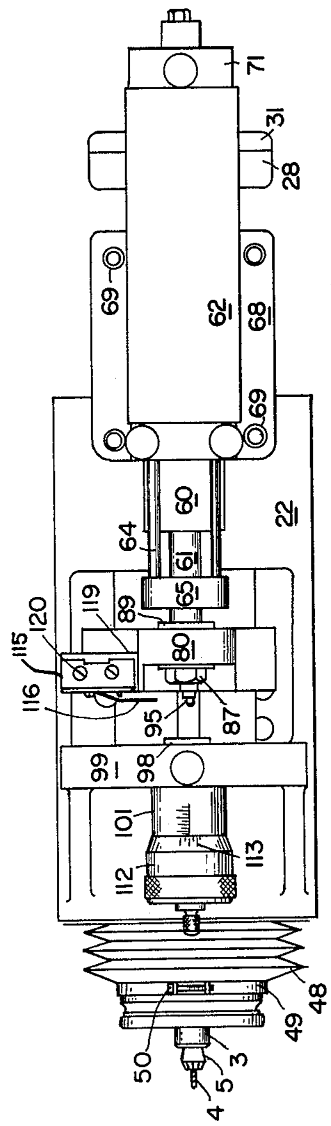
FIG. 4 is a plan view.

In the preferred embodiment shown in the drawings, a cylindrical feed slide 1 is formed with an internal axially-extending bore 2, receiving a quill shaft 3 therein. The quill shaft is arranged to support a cutting tool 4 therein, as by means of a chuck 5 received in a suitable tapered opening 6 formed in an end of the quill shaft. The quill shaft is rotatably mounted in the feed slide for axial movement therewith by means of spaced ball bearings 7 retained by snap-rings 8. The ends of the feed slide are grooved at 9 and 10 to receive a pair of snap-acting dust caps 11 and 12 thereon, respectively. Along an opposite end thereof protruding from the rear of the feed slide, the quill shaft is formed with a spline 13 receiving a spined sleeve 14, which is affixed to a pulley 15 for rotating the quill shaft and the cutting tool. A belt 17 drives the pulley 15 from suitable rotary driving means, such as an electric motor 18 and a pulley 19.

As shown, the sleeve is formed with an oversized internal spline 16 loosely engaging the spline 13 of the quill shaft. In order to prevent the application of any canting moment to the quill shaft by the belt 17, which might tend to deflect it from the machining axis, the sleeve 14 is mounted in a pair of independent ball bearings 20 and 21 by means of axially-extending annular flanges 22 and 23 formed in the sleve. The loosely-fitting splines of the pulley and the quill shaft permit any canting moment to be absorbed by the bearings 20 and 21, rather than by the quill shaft.

The feed slide is organized within a housing 24, which includes a removable bearing support 25 secured thereon by machine screws 26. The support 25 includes flange portions 27 and 28, which receive the bearings 20 and 21 in suitable recesses 29 and 30 formed therein, respectively. An annular cap plate 31 is secured over the rearward portion of the flange 28 by means of cap screws 32, to secure the bearings and the pulley 15 in assembled relation in the housing.

The housing is further formed with a pair of bearing supports 33 and 34, spaced apart axially along the machining axis to form a recess 35 therebetween. A pair of hardened cylindrical bearing sleeves 36 and 37 are press-fitted into the supports 33 and 34, respectively, to receive and guide bearings supporting the feed slide. These bearings comprise groups of balls 40 and 41, arranged in a pattern surrounding the feed slide 1 in such a manner that any given ball will not move in the longitudinal path of another. The balls are loosely held in this pattern by tubular retainer sleeves 38 and 39, which are formed with holes slightly larger than the balls and arranged in an appropriate pattern to retain them. To afford maximum accuracy of movement of the feed slide, the balls are slightly oversized so as to be pre-loaded by their insertion into the sleeves 36 and 37, respectively. A pair of spacer bars 42 and 43 are interposed between the retainers 38 and 39, and extend longitudinally of the feed slide to maintain the bearings in their relatively spaced positions should the balls slip or skid. The quill shaft and feed slide are thus mounted for reciprocal movement in an accurate manner along the machining axis.

To prevent the entrance of dust into the retainers 38 and 39, a flexible bellows seal 48 is secured about the protruding end of the feed slide 1 by means of a split clamp 49 compressed thereon by a threaded fastener 50, and about a radial face 52 of the housing by means of a plurality of machine screws 53 which clamp the periphery of the seal between annular washers 54 and 55.

Figure 1:
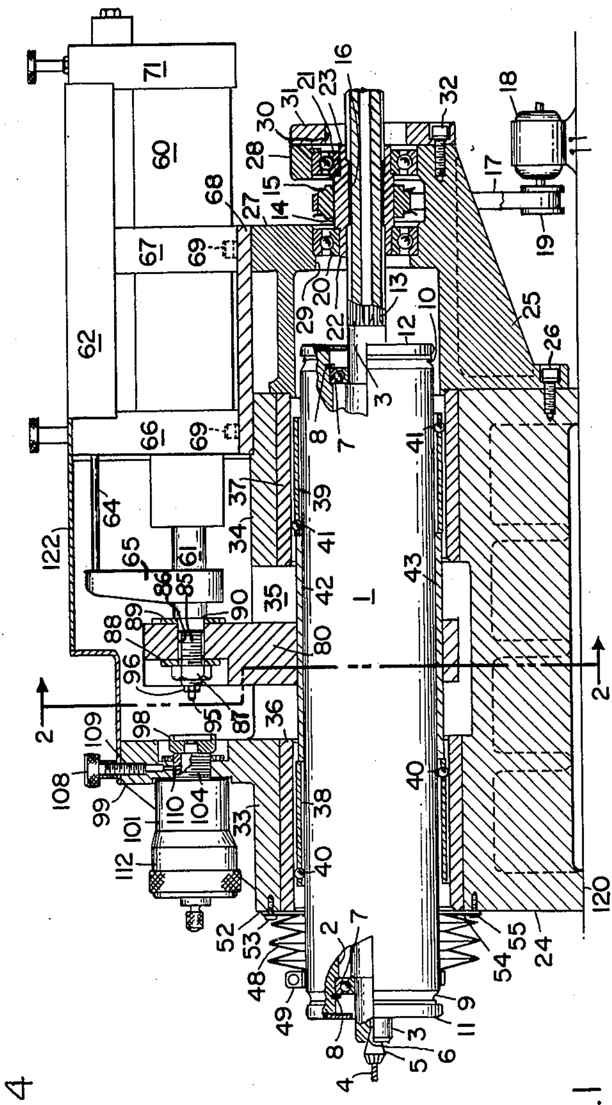
FIG. 1 is a view in side elevation, and partially in section, of a machining apparatus according to the invention.
Figures 2, 3:
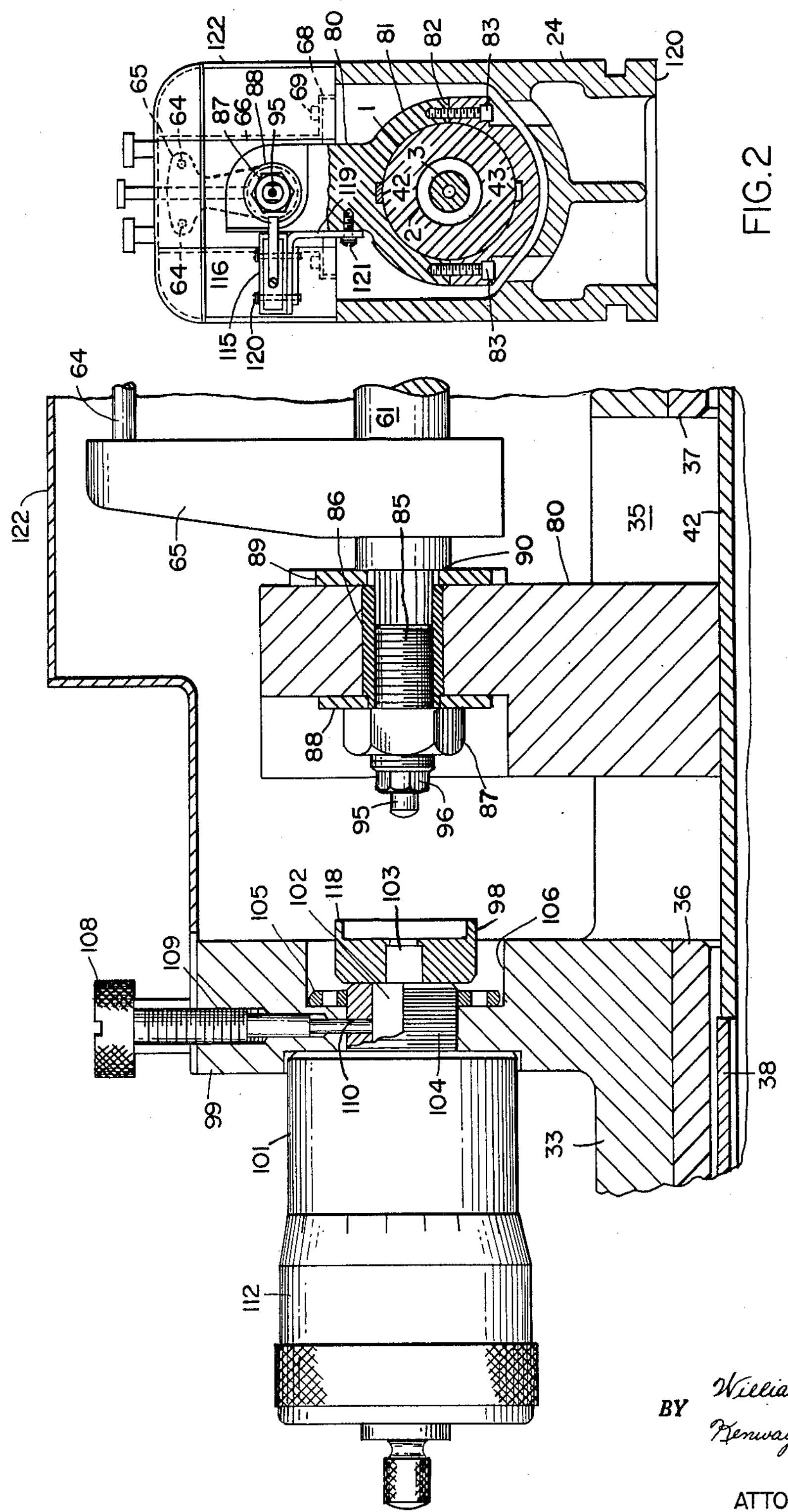
FIG. 2 is a sectional view taken along line 2—2 in FIG. 1, looking in the direction of the arrows.
FIG. 3 is a sectional view in side elevation of a portion of the apparatus.

For reciprocating the feed slide and the quill shaft to feed the cutting tool 4 to and from a work-piece (not shown), a combination pneumatic and hydraulic actuator 60 is provided for rectilinear movement of an actuating rod 61 thereof along an axis which is laterally offset from, and parallel to, the machining axis. Any conventional form of motive means may be utilized for affording a feeding motion along this offset axis. The actuator 60 is of a well known and commercially-available type, and no detailed description thereof is believed necessary. Suitable valving means 62 are provided for controlling the actuator, and the actuating rod 61 carries a pair of valve rods 64 upon a radial bracket 65 affixed thereto, for regulating the valving means in response to the position of the rod 61 along its axis of actuation. The valve means 62 are preferably so arranged that the actuator initially transverses rapidly to the left as viewed in FIG. 1, and feeds at a reduced rate when a position is reached in which the cutting tool engages a work-piece, thereafter feeding at a desired rate for optimum machining characteristics. The actuator 60 and valve means 62 are mounted in upstanding portions 66 and 67 of a bracket 69, which is secured upon the housing 27 by means of machine screws 69. A further bracket 71 extends between the valve means and the actuator, and is formed with suitable internal passages for hydraulic or pneumatic fluid. Suitable conduit means (not shown) are provided to supply pressurized hydraulic or pneumatic fluid to the valve means and thence to the actuator. These means may be of any well-known type and arrangement and no further detailed description thereof is believed necessary.

According to a feature of the invention, I provide means for transmitting movement of the rod 61 to the feed slide 1 which minimize the canting effect upon the feed slide of the torque arising from the laterally offset position of the actuator. These means comprise an arm 80 interconnecting the rod 61 with the feed slide at a point intermediate the retainers 38 and 39. The arm 80 is received in the recess 35 with substantial axial clearance to accommodate the feeding movement. An annular boss 81 is formed in the lower end of the arm and transversely split at 82, the halves of the boss being secured upon the feed slide by means of a pair of machine screws 83. The boss is recessed to receive the spacer bars 42 and 43. At its upper end, the arm receives a threaded extension 85 of the rod 61 in an opening 86, and the extension is secured therein by means of a nut 87 threaded on the extension to clamp a washer 88, the arm, and a washer 89 upon a shoulder 90 formed upon the rod 61.

The torque or force couple established by the actuating force of the rod 61 and the reaction of a work-piece along the laterally off-set axes is applied substantially equally to the helical bearings 38 and 39 by the radial arm 80 interposed therebetween, and because of the pre-loaded condition of the balls 40 and 41, produces a minimum canting movement of the feed slide and the quill shaft. I have found that holes machined by the improved apparatus may be held to an accuracy of less than one ten-thousandth of an inch in diameter.

To limit the axial movement of the feed slide for machining a work-piece to a predetermined depth, I provide adjustable stop abutment means including a stop pin 95, which is threaded axially into the protruding end of the rod extension 85 by means of a hexagonal head 96 formed thereabout. The stop means also includes an adjustable micrometer head 101, supported in an upstanding portion 99 of the housing 24. The micrometer head has a movable spindle 102 terminating in a stop anvil 103, upon which a collar 98 is press-fitted. The micrometer head is supported in a fixed position by means of an annular collar 104 thereof, receiving the spindle 102 and threadedly engaged in the housing portion 99. A locking nut 105 is threaded upon the collar 104 and jammed against a radial face of a recess 106 formed in the housing portion 99, to secure the micrometer head in a fixed position therein. The micrometer spindle 102 may be secured in a selected position by means of a locking screw 108 threadedly engaged at 109 in the housing portion 99, and passing through a radial opening 110 in the collar 104 into locking engagement with the periphery of the spindle 102. The micrometer head is conventionally formed, having an adjusting barrel 112 drivingly connected with the spindle 102 and rotatably mounted upon the head for indicating the position of the spindle by means of a scale 113.

A switch 115 having an actuating arm 116 is supported by the arm 80 for engagement with a peripheral lip 118 formed about the collar 98. The switch is mounted upon a bracket 119 by screws 120, the bracket being secured to the arm by screws 121. While the details of connection and operation of the switch form no part of the present invention, it is desirable to arrange the microswitch for actuation a short distance prior to the engagement of the stop pin 95 with the anvil 103. The microswitch then actuates a timer (not shown) which, upon the completion of a predetermined cycle, causes the control 62 to deenergize the actuator 60 to relieve the axial load upon the stop pin shortly following its engagement with the anvil 103.

The positioning of the stop abutment means upon the laterally-offset axis of the actuator rod 61 prevents the application of the reaction force produced by the braking of the actuator to the feed slide as a canting moment. It will thus be apparent that by this arrangement of the stop abutment means I further eliminate a potential source of inaccuracy in the operation of the machining apparatus.

The base of the housing 24 is formed with a plane surface 120 for supporting the apparatus upon a plane surface with the machining axis precisely parallel thereto. Where it is desired to carry on a multiplicity of machining operations on a workpiece concurrently, a number of the machining devices may conveniently be mounted upon a plane surface to facilitate their accurate registration. A cover member 122 is placed over the housing portion 99 to enclose the moving parts against the accumulation of dust and dirt.

It will be apparent from the foregoing description that I have provided an improved precision machining apparatus having means for minimizing canting movement of a feed slide induced by the forces of actuation and braking of motive means laterally offset from the machining axis. Various changes and modifications will readily occur to those skilled in the art without departing from the true spirit and scope of the invention, and I therefore intend to define the invention in the appended claims without limitation to specific details of construction set forth by the foregoing description.

What I claim and desire to secure by Letters Patent of the United States is:

1. A precision machining apparatus comprising a feed slide, at least a pair of anti-friction bearings supporting said feed slide for movement along a machining axis, a housing supporting said bearings, said bearings being spaced apart along said axis and compressed between said feed slide and said housing and thereby pre-loaded to restrain said feed slide against canting movement with respect to said housing, a quill shaft for supporting a cutting tool, said quill shaft rotatably mounted in said feed slide for movement therewith along said axis, motive means arranged for rectilinear movement along a further axis parallel to and offset from said machining axis, an arm secured to said slide axially intermediate of said bearings and secured to said motive means for movement of said slide along said machining axis, and stop abutment means adapted to brake said feed slide in a preselected axial position thereof, said stop abutment means supported in said housing along said further axis for direct interference with said motive means in a position of said motive means corresponding to said predetermined position of said feed slide, whereby said arm is relieved of braking torque.

2. A precision machining apparatus as recited in claim 1, together with spacer bars interposed axially between said bearings to restrain relative axial movement thereof in the event of bearing slippage.

References Cited in the file of this patent

UNITED STATES PATENTS

| | | |
|---|---|---|
| 2,357,514 | Huennekens et al. | Sept. 5, 1944 |
| 2,473,430 | Hoffar | June 14, 1949 |
| 2,587,352 | Manning | Feb. 26, 1952 |
| 2,605,751 | Perry et al. | Aug. 5, 1952 |
| 2,698,603 | Macewka | Jan. 4, 1955 |
| 2,964,020 | De Fibaugh | Dec. 13, 1960 |